US007926386B1

(12) United States Patent
Godfrey

(10) Patent No.: US 7,926,386 B1
(45) Date of Patent: Apr. 19, 2011

(54) DETACHABLE TELESCOPING ADJUSTABLE GOOSENECK FOR A BICYCLE

(75) Inventor: Dennis Lee Godfrey, Sycamore, IL (US)

(73) Assignee: Dennis Godfrey, Sycamore, IL (US)

( * ) Notice: Subject to any disclaimer, the term of this patent is extended or adjusted under 35 U.S.C. 154(b) by 319 days.

(21) Appl. No.: 11/807,135

(22) Filed: May 25, 2007

(51) Int. Cl.
*B62K 21/16* (2006.01)
(52) U.S. Cl. .................................................. 74/551.3
(58) Field of Classification Search .............. 74/551.3, 74/551.4, 551.5, 551.6, 551.7; 16/421; 180/219, 180/222; 280/278
See application file for complete search history.

(56) References Cited

U.S. PATENT DOCUMENTS

| 613,970 | A | * | 11/1898 | Christy | 403/108 |
| 617,500 | A | * | 1/1899 | Ehling | 403/106 |
| 5,327,798 | A | * | 7/1994 | Lerch, Jr. | 74/551.3 |
| 5,887,490 | A | * | 3/1999 | Dittmar | 74/551.3 |
| 6,206,395 | B1 | * | 3/2001 | Young | 280/278 |

* cited by examiner

Primary Examiner — Vicky A Johnson

(57) ABSTRACT

My invention is an apparatus, that adjusts the vertical position of a bicycle handlebar assembly, through the use of an adjustable telescoping gooseneck; which adjusts by the use of a sliding shaft; IE gooseneck, through a sleeve, which replaces the original stem or gooseneck of a bicycle; allowing the rider to raise or lower the handlebar position, while still riding, through the use of a retractable locking pin, that is actuated remotely, by a lever that is mounted on the handlebar. My invention does not pivot in any way and the complete handlebar/gooseneck assembly is completely removable from the bicycle frame, for ease of storage.

3 Claims, 3 Drawing Sheets

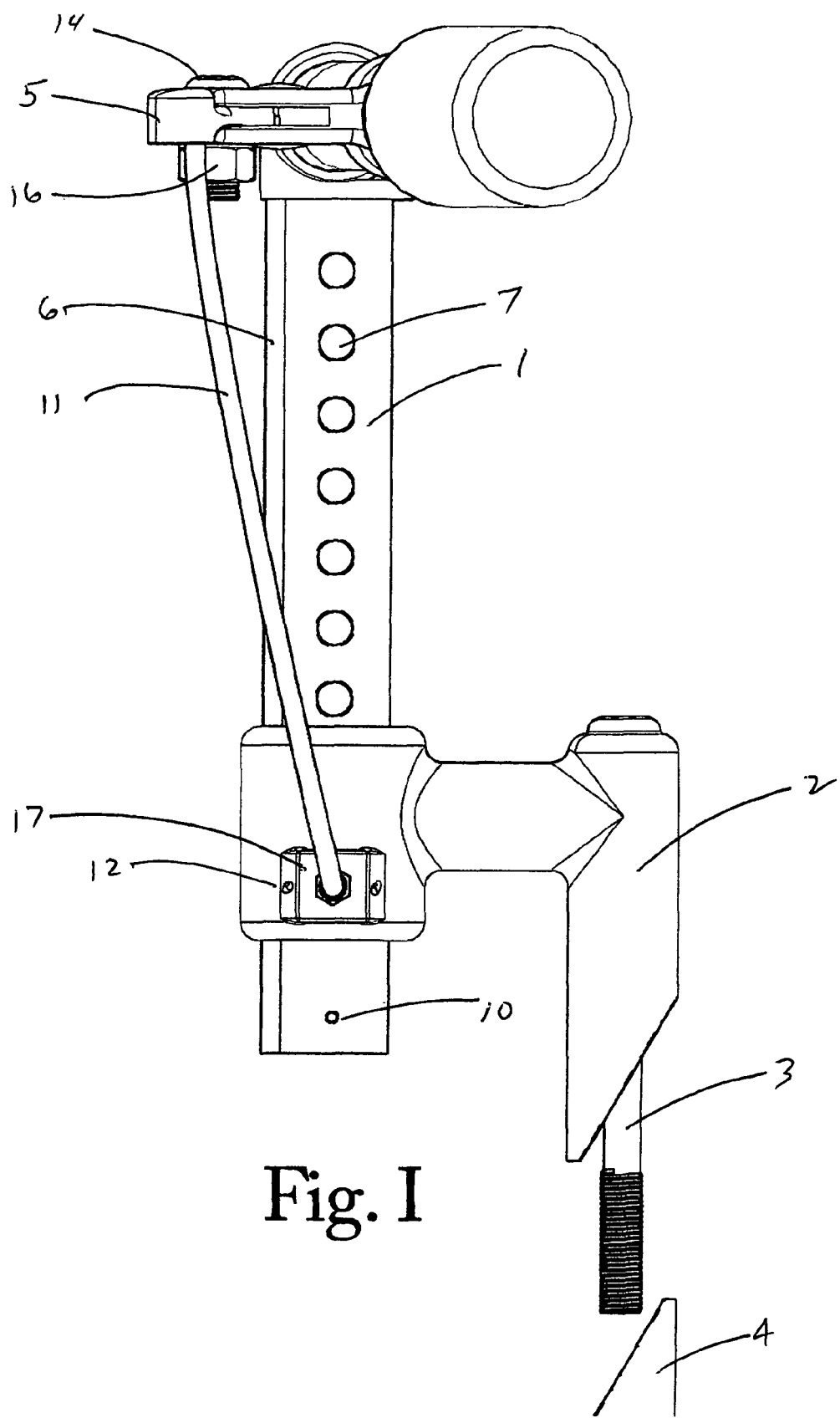
Fig. I

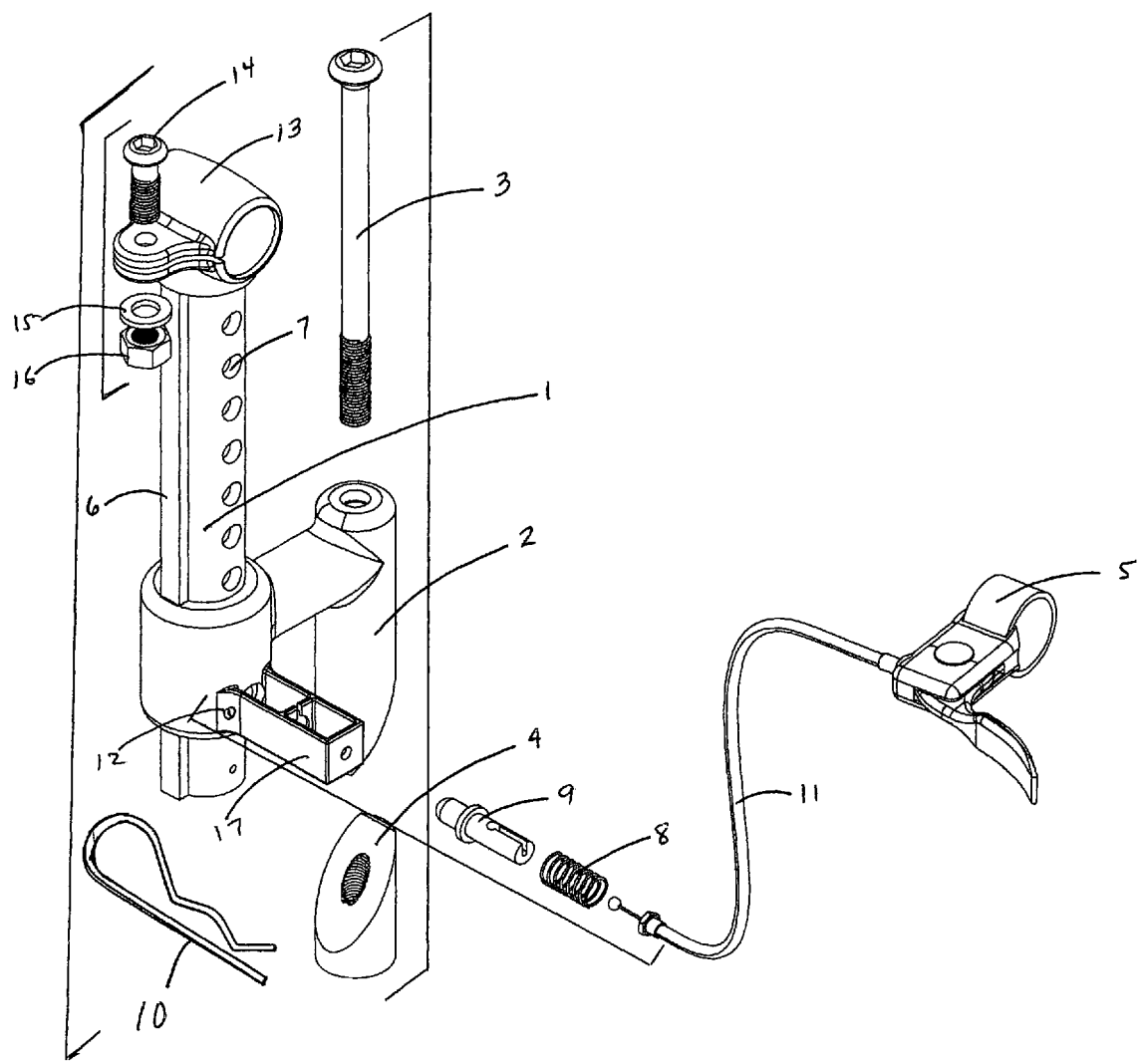
Fig. II

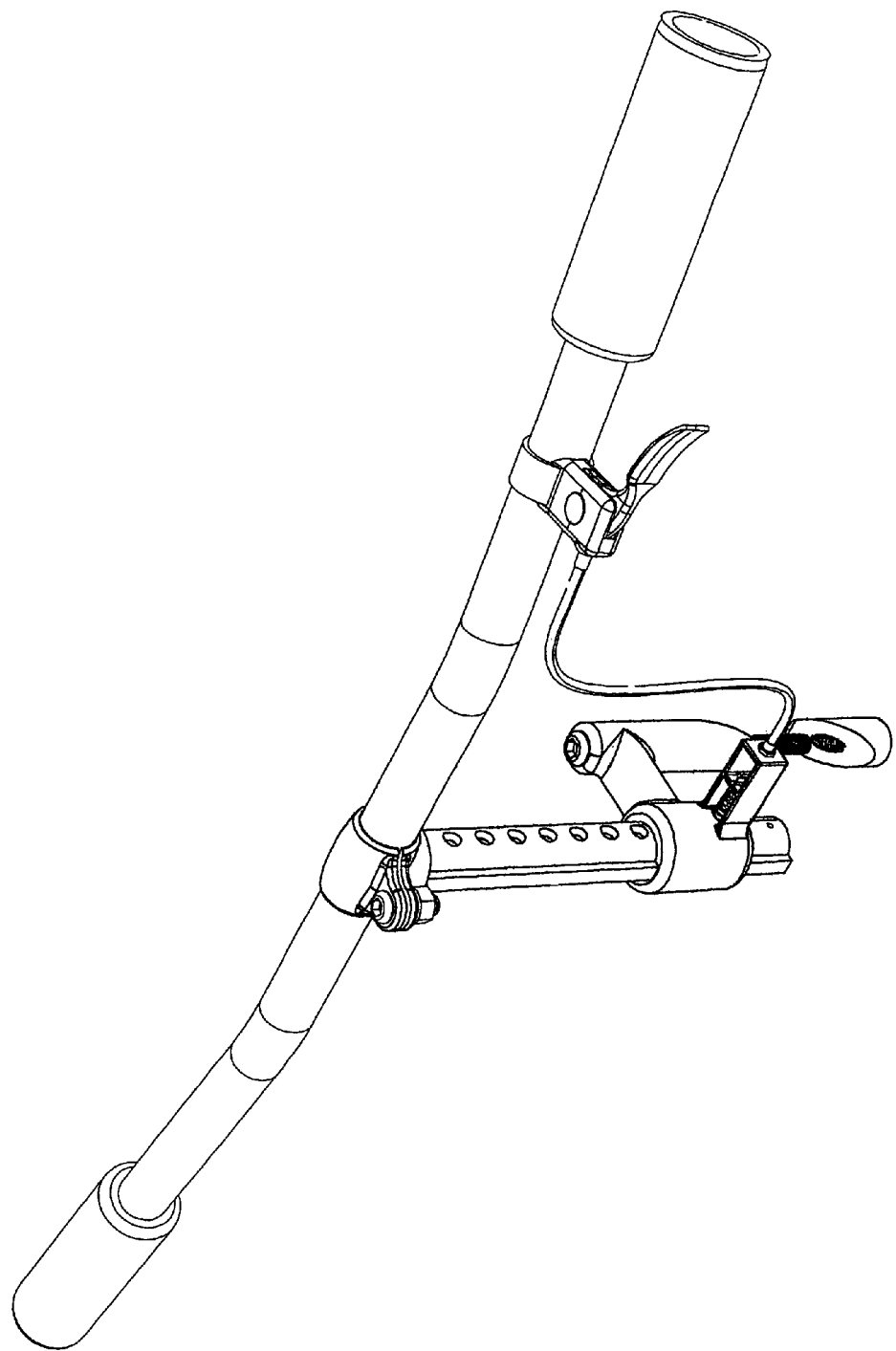
Fig. III

DETACHABLE TELESCOPING ADJUSTABLE GOOSENECK FOR A BICYCLE

BACKGROUND OF THE INVENTION

The present invention relates to bicycle handlebars; and particularly their position in relation to the standard position originally dictated by the manufacturer.

History has shown that when bicycling for long distances, a rider can become fatigued, sitting in the same position for extended periods of time. My invention; a Detachable Telescoping Adjustable Gooseneck, differs from prior art, in that it allows the rider to change the position of the gooseneck/handlebar assembly, vertically, while continuing to ride the bicycle, via a quick release lever mounted on the handlebars.

My invention does not pivot in any manor, thereby making it almost maintenance free, and cost effective for manufacture and retail sales.

Prior art, U.S. Pat. No. 6,206,395B1 is a Pivoting and Adjustable Gooseneck and differs from my invention in that has too many parts involved to make it feasible for manufacture and would require quite a bit of maintenance for basic upkeep. This invention has less vertical adjustments then my invention has.

Prior art, U.S. Pat. No. 5,327,798 is only a pivoting type gooseneck, and has all the same drawbacks as discussed above.

Prior art, U.S. Pat. No. 5,887,490 is also a pivoting type gooseneck, and it too has all the drawbacks as discussed above.

BRIEF SUMMARY OF THE INVENTION

My invention solves problems associated with stationary positions of bicycle handlebars, namely rider fatigue, by allowing the rider the option of adjusting the vertical position of the handlebar.

Further my invention allows the rider to make changes while continuing to ride their bicycle, via a remotely mounted release lever.

Furthermore, my invention will allow the rider to make body position changes, to either take advantage of the wind, or to make changes that will make it easier to ride into a headwind etc., all without stopping the bicycle, and without the use of tools.

Furthermore, my invention has another distinct advantage to prior art; in that the complete handlebar/gooseneck assembly, can be removed from the bicycle frame, for ease of stowage/storage, by removing a retaining pin, at the base of the main shaft.

BRIEF DESCRIPTION OF THE SEVERAL VIEWS OF THE DRAWING

Referring to FIG. I, left side plan view, FIG. II left side exploded isometric view, of the preferred embodiment, of a telescoping adjustable bicycle gooseneck, is shown to comprise the following parts. The stem assembly 2, and bolt 3, and crush sleeve 4, mount and secure the complete handlebar/gooseneck assembly, to the original bicycle frame. The telescoping gooseneck 1, slides into the stem assembly 2, and is prevented from turning left to right or visa versa, by a keyway 6; this telescoping shaft has height adjusting detents 7, in which the spring 8, loaded release pin 9, inserts into; which locks the handlebar assembly into position vertically. The retaining pin 10, at the bottom of the telescoping gooseneck keeps the shaft from coming out of the stem 2, but at the same time allowing the rider to remove it, allowing for ease of storage or portability. The release pin 9, is activated by a cable 11, which is connected to a remotely mounted release lever assembly 5, at one end. The spring/pin assembly at the other end, is contained inside the retaining housing 17, that is mounted to the stem assembly 2, by two screws 12. The handlebars are secured to the gooseneck assembly by the tightening clamp 13, which includes a tightening bolt 14, washer 15, and nut 16, all of which is part of the complete gooseneck assembly.

Referring to FIG. III; this is a grey tone perspective view of the complete assembled invention, minus the retaining pin 10, at the bottom of the gooseneck.

DETAILED DESCRIPTION OF THE INVENTION

The present invention relates to bicycles, and the handlebar/gooseneck area in particular, in which the position of an OEM/factory handlebar assembly is sold in a stationary position. My invention is a vertically adjustable telescoping gooseneck which allows the rider to remotely, adjust handlebar height vertically, while riding their bicycle, to whatever is a comfortable position for them.

Prior art; see Background of the Invention for Patent numbers and brief descriptions; addresses handlebar adjustment through the use of various ways to pivot the handlebars; whereas my invention adjusts only vertically.

Due to the simplistic design of my invention; the cost of manufacture, would be much more cost effective, making it more attractive for the retail marketplace.

Finally, my invention has one more feature that prior art does not address; and that is the ease of removal of the handlebar/gooseneck assembly from the bicycle frame, allowing for a more compact way to store/transport a bicycle, by simply pulling a retaining pin, located at the base of the main shaft.

What is claimed is:

1. A detachable telescoping adjustable gooseneck for a bicycle comprising:
   a telescoping gooseneck with a key attached the entire length of the gooseneck up to a tightening clamp, nut, bolt, and washer secured at the top of the gooseneck;
   a stem assembly with a circular opening and keyway through which the gooseneck and key is inserted, such that the gooseneck is unable to rotate;
   a nut and bolt assembly for mounting the stem assembly to a bicycle frame;
   a cable with a first end attached to a lever assembly and the second end attached to a spring loaded release pin in a retaining housing.

2. The detachable telescoping adjustable bicycle gooseneck according to claim 1 having an adjusting means comprising:
   the lever assembly for mounting on a bicycle handlebars;
   the retaining housing mounted on the bicycle stem assembly, housing the release pin with a spring encompassing it;
   the cable mounted to the lever assembly on the first end, and the second end of the cable attached to the spring loaded pin in the retaining housing.

3. The detachable telescoping bicycle gooseneck according to claim 1 having a detachable means comprising:
    a bore drilled through at the bottom of the gooseneck with a retaining pin inserted in it that is removed and depressing the lever assembly on the handlebars to remove the release pin from the aperture on the gooseneck allowing the gooseneck to be lifted up and out of the stem assembly.

\* \* \* \* \*